United States Patent Office 3,637,900
Patented Jan. 25, 1972

3,637,900
POLYAMIDE FIBERS WITH ALIPHATIC SULFONIC
ACID CONTAINING ANTISTATIC AGENTS
Isao Kimura and Fumimaro Ogata, Osaka, and Koichiro Ohtomo, Settsu, Japan, assignors to Kanegafuchi Boseki Kabushiki Kaisha, Tokyo, Japan
No Drawing. Filed Apr. 20, 1970, Ser. No. 30,212
Claims priority, application Japan, Apr. 22, 1969, 44/31,415
Int. Cl. C08g 41/04, 45/12
U.S. Cl. 260—830 P
10 Claims

ABSTRACT OF THE DISCLOSURE

A fiber having durable anti-electrostatic and hydrophilic properties to withstand repeated launderings, which comprises a polymer composition consisting of 99.95—60% by weight of a thermoplastic synthetic linear polymer such as polyamides, polyesters, polyesterethers, polyolefins, polyurethanes, polyvinylchloride and polystyrene, and 0.05—40% by weight of at least one sulphonic acid containing compound which is synthesized by sulphonating an epihalohydrin homopolymer or an alkyleneoxide/epihalohydrin block copolymer.

---

This invention relates to synthetic fibers comprising a thermoplastic linear polymer which are provided with durable anti-electrostatic and hydrophilic properties.

Heretofore, there have been known numerous synthetic fibers comprising a thermoplastic synthetic linear polymer, and those consisting of a polyamide or a polyester which have been manufactured on the largest industrial scale among the others are extremely hydrophobic as compared with natural fibers, so that the fact that many drawbacks as well as advantageous features of those synthetic fibers are resulted from their hydrophobicity cannot be overlooked. Namely, hydrophobic fibers and clothes made therefrom have disadvantages such as a waxy feeling, a poor fit, an aptitude to be grease stained, a difficulty to remove stains, and a liability to have an electrostatic charge by friction which causes attraction of dust and various uncomfortable wearing properties. All of such disadvantages closely relate to the hydrophobicity of fibers.

In order to obviate such a hydrophobicity and its resultant drawbacks of synthetic fibers, numerous improved synthetic fibers having anti-electrostatic and hydrophilic properties have been proposed. However, most of those proposals comprise providing temporarily synthetic fibers or textile product therefrom with anti-electrostatic and hydrophilic properties by a surface treatment. The rest of the proposals are to incorporate an anti-electrostatic or hydrophilic agent into synthetic fiber-forming polymer prior to its spinning process and however most of synthetic fibers produced therefrom have been denatured with respect to their inherent excellent characteristics.

The inventors have carried out extensive studies on fibers composed of a synthetic thermoplastic polymer such as a polyamide, polyester, polyesterether and the like having superior anti-electrostatic and hydrophilic properties which are prepared by providing a hydrophilic property thereto without denaturing their inherent excellent characteristics, and have accomplished the present invention.

An object of the present invention is to provide synthetic fibers having exceedingly durable anti-electrostatic and hydrophilic properties which withstand laundering.

Namely, the present invention is a fiber having durable anti-electrostatic and hydrophilic properties which comprises a polymer composition consisting of 99.95—60% by weight of a thermoplastic synthetic linear polymer and 0.05—40% by weight of at least one sulphonic acid containing compound selected from the group consisting of:

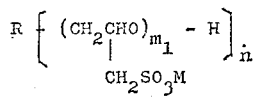

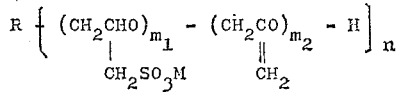

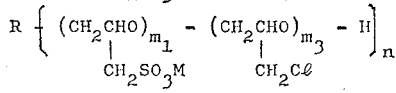

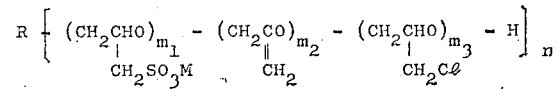

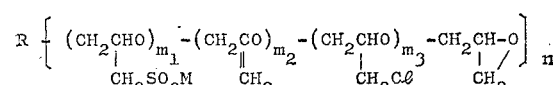

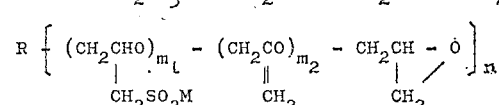

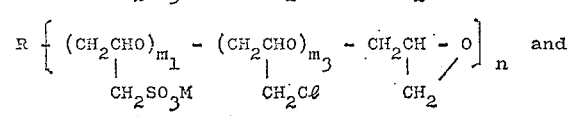 and

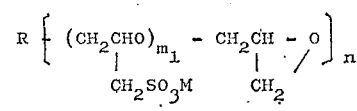

where, $n$ is an integer of 1 or 2; when $n$ is 1, R denotes hydrogen, $R_1O-$ or $R_1O-$(polyalkyleneoxide)- wherein $R_1$ denotes hydrogen, or an alkyl, aralkyl or aryl group having 1–18 carbon atoms, or a cycloalkyl group having an alicyclic ring formed by 3–8 carbon atoms, or carboxylic acid residue which is represented by omitting terminal hydroxyl group from carboxylic group; when $n$ is 2, R denotes a polyalkyleneoxide group; further $m_1$ is an integer of 1–30; $m_2$ and $m_3$ are integers of 1–6; and M denotes hydrogen, an alkali metal or alkaline earth metal.

In the present invention, the polyalkyleneoxide means a homopolymer of an alkyleneoxide such as ethyleneoxide, propyleneoxide, tetramethyleneoxide and the like, or a random or block copolymer of at least two alkyleneoxides as mentioned above. The polyalkyleneoxide having its average molecular weight of up to 20,000 is effectively employed and a more preferable average molecular weight is not larger than 10,000. When the average molecular weight is in excess of 20,000, the concentration of $-SO_3M$ group in the molecule decreases and therefore, a preferable result is not obtained.

As the alkyl group having 1–18 carbon atoms, mention may be made of, for instance, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl, and as the aralkyl group, benzyl, methylbenzyl, ethylbenzyl, propylbenzyl, methylethylbenzyl, pentylbenzyl, hexylbenzyl, heptylbenzyl, octylbenzyl, nonylbenzyl, decylbenzyl, undecylbenzyl, etc.

The aryl group is biphenyl, naphtyl or an aromatic alcohol residue having a hydroxyl group omitted from an aromatic alcohol represented by the general formula,

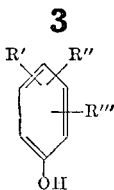

where, R', R'' and R''' denote hydrogen and/or an alkyl group having 1-18 carbon atoms. As such aromatic alcohols, mention may be made of, for instance, phenols such as n-butylphenol, isobutylphenol, amylphenol, dibutylphenol, diamylphenol, tripropylphenol, heptylphenol, octylphenol, monylphenol, decylphenol, undecylphenol, tridecylphenol, tetradecylphenol, cetylphenol, oleylphenol, octadecylphenol, dihexylphenol, trihexylphenol, diheptylphenol, dioctylphenol, dinonylphenol, docecylphenol and the like, and cersols derived from the above mentioned phenols by adding methyl groups to the aromatic nucleus thereof.

The cycloalkyl group is cyclopropyl, cyclobutyl, cyclopentyl, cyclohexyl, cycloheptyl, cyclooctyl or the like.

Furthermore, as the carboxylic acid for the carboxylic acid residue which is represented by omitting terminal hydroxyl group from carboxylic group, mention may be made of, for instance butyric acid, caproic acid, caprylic acid, capric acid, lauric acid, myristic acid, palmitic acid, stearic acid, oleic acid, ricinoleic acid, etc.

The M contained in the sulphonic acid or its salt is hydrogen, an alkali metal such as lithium, sodium, potassium and the like, or an alkaline earth metal such as magnesium, calcium, zinc, barium and the like. When, in particular, M is an alkaline earth metal, the solubility in water of the aforementioned compound having sulphonic acid groups can be lowered and further there may occur a case such that those metals bond to a sulphonic acid group of another compound so that the solubility of the compound can be remarkably lowered.

For the thermoplastic synthetic linear polymer, constituting the synthetic fibers of the present invention, preferable are melt spinnable polymers such as polyamides, polyesters, polyesterethers, polyolefins, polyurethanes, polyvinylchloride, polystyrene and the like, and particularly preferable are polyamides, polyesters and polyesterethers among the others.

In the present invention, the above mentioned polyamides are homopolyamides and copolyamides obtained by polycondensing at least one amide-forming compound selected from the group consisting of lactams, ω-aminocarboxylic acids, and salts of a diamine and a dicarboxylic acid, in particular, ε-caprolactam, ε-aminocaproic acid and a nylon salt obtained from an arbitrary combination of a diamine such as an α,ω-aliphatic diamine, e.g., hexamethylene diamine, a heterocyclic diamine, e.g., piperazine, dimethylpiperazine and N,N'-substituted ring containing diamine derived therefrom, an alicyclic diamine represented by bis(p-aminocyclohexyl)methane or the like and an aromatic ring containing diamine, e.g., m-xylylenediamine and p-xylylenediamine, with a dicarboxylic acid such as an aliphatic dicarboxylic acid, e.g., adipic acid, sebacic acid, azelaic acid, 1,10-decane dicarboxylic acid, etc., a ring containing dicarboxylic acid, e.g., terephthalic acid, isophthalic acid and alicyclic acid obtained by hydrogenating the aromatic ring thereof.

Among the polyamide as mentioned above, preferable in the present invention is a polycondensation product of γ-butyrolactam, δ-valerolactam, ε-caprolactam, heptolactam, 6-aminocaproic acid, 7-aminoheptanoic acid, 9-aminononanoic acid, 11-aminoundecanoic acid or a nylon salt consisting of tetramethylenediamine, pentamethylenediamine, hexamethylenediamine, heptamethylenediamine, octamethylenediamine, nonamethylenediamine, decamethylenediamine, undecamethylenediamine, dodecamethylenediamine, m-xylylenediamine, bis(γ-aminopropyl)ether, N,N' - bis(ω - aminopropyl)piperazine or 1,11-diaminoundecane, and terephthalic acid, isophthalic acid, glutaric acid, adipic acid, pimelic acid, suberic acid, azelaic acid, sebacic acid, dodecane dicarboxylic acid, hexahydroterephthalic acid, diphenylene-4,4'-dicarboxylic acid, diphenylmethane-4,4'-dicarboxylic acid or diphenylether-4,4'-dicarboxylic acid.

As the polyesters employed in the present invention, polyethylene terephthalate (hereinafter referred to as PET) and modified polyester predominantly comprising PET are most representative. The modified polyester means a polycondensation product of PET forming materials and at least one bifunctional ester forming material selected from the group consisting of: aliphatic diols such as diethylene glycol, trimethylene glycol, tetramethylene glycol and the like; alicyclic diols such as 1,4-cyclohexane dimethanol, 1,4-cyclohexane diol and the like; aliphatic dicarboxylic acids such as adipic acid, sebacic acid, 1,10-decane dicarboxylic acid and the like; aromatic dicarboxylic acids such as isophthalic acid, sodium sulfoisophthalic acid, naphthalene dicarboxylic acid and the like; alicyclic dicarboxylic acids such as hexahydroterephthalic acid, hexahydroisophthalic acid and the like; oxycarboxylic acids such as para-hydroxybenzoic acid and the like; and functional derivatives thereof.

Furthermore, the polyesterethers to be applied to the present invention include polyethylene oxybenzoate and various copolymers predominantly comprising polyethylene oxybenzoate.

The above mentioned polyamides, polyesters and polyesterethers may contain, as additives, inorganic or organic substances such as delustrants, pigments, dye stuffs, light stabilizers, fluorescent whitening agents, heat stabilizer, plasticizers, etc., if required.

In the present invention, the amount of the sulphonic acid containing compound to be incorporated into the thermoplastic synthetic linear polymer is in a range of 0.05—40% by weight based on the composition, preferably of 0.1—30% by weight and more preferably of 0.5—10% by weight. As far as the content of the sulphonic acid containing compound in the polymer composition is in the above mentioned range, a synthetic fiber having exceedingly durable anti-electrostatic and hydrophilic properties is obtainable from the polymer composition as such, without substantially deteriorating excellent properties inherent in the fibers of synthetic linear polymers, e.g., tenacity, elongation, tensile elasticity and dye receptivity of polyamide fibers, wash and wear property, heat stability, heat settability and high Young's modulus of polyester fibers, etc. In case that the content of the sulphonic acid containing compound is less than 0.05% by weight, the effect of provision of anti-electrostatic and hydrophilic properties to synthetic fibers will be insufficient while if it is in excess of 40% by weight, it is not, preferably because various superior properties inherent in fibers of synthetic linear polymer will be deteriorated.

The sulphonic acid containing compound to be incorporated uniformly into synthetic fibers may be in any form of liquid, grease and wax, and it may be added in either form of an aqueous solution or an aqueous dispersion to the polymer.

When the polymer is a polyamide, the sulphonic acid containing compound may be incorporated either with raw materials for the polyamide prior to or during the polycondensation reaction or with the molten polyamide after the polycondensation reaction. On the other hand, in the case that the polymer is a polyester or a polyesterether, the sulphonic acid containing compound can be incorporated in a uniformly dispersed state with the polymer, by adding thereto prior to the ester interchange reaction or in a time between the ester interchange reaction and the polycondensation reaction, or after the polycondensation reaction, and in particular, it is preferred to add in a time after the ester interchange reaction and before the polycondensation reaction.

Further, a greater amount than required of the sulphonic acid containing compound may be added to the polymer before, during or after the polymerization reaction to prepare in advance a master chip of high content of the sulphonic acid containing compound, and then the thus obtained master chip may be incorporated with the polymer also by adding before, during or after the polymerization reaction. Furthermore, the master chip and a polymer chip containing no sulphonic acid containing compound can be blended mechanically, or those two chips can be conjugated to form a composite chip which is thereafter subjected to a melt spinning process to obtain a synthetic fiber comprising a polymer composition having the sulphonic acid containing compound uniformly incorporated thereinto.

The sulphonic acid containing compound to be incorporated into the synthetic fiber of the present invention has almost the same melting point as compared with a similar compound having no sulphonic acid group and, however, has such a high melt viscosity that it shows an excellent compatibility with polyamides, polyesters, polyesterethers, polyolefins, etc., and that it exhibits satisfactory miscibility with and dispersibility in those polymers, so that there never occurs an uneven dispersion or a phase separation during the step of polymerization melt blending or of melt spinning.

Particularly when the above mentioned sulphonic acid containing compound has an active group besides the sulphonic acid group, such as an active chlorine, an unsaturated ethylene group, an epoxy group and the like, the active group as such links firmly with another active group in the polymer so that an effect of prevention against disincorporation is further markedly increased, thus yielding the polymer composition possessing durable and excellent hydrophilic and anti-electrostatic properties.

It is an outstanding feature of the sulphonic acid containing compound that, as mentioned above, it exhibits a good compatibility with a synthetic linear polymer, e.g., a polyamide, polyester and polyesterether, and on the other hand a similar compound having no sulphonic acid never exhibits such an excellent compatibilty.

When the polymer composition consisting of a sulphonic acid containing compound and a synthetic linear polymer such as a polyamide, polyester and polyesterether is solely melt-spun or co-spun with a polymer same as above which does not have the sulphonic acid containing compound incorporated or with a different polymer and the formed filament is subjected to a drawing process, then a synthetic fiber having excellent anti-electrostatic and hydrophilic properties is manufactured. In particular, a conjugate fiber which consists of at least two adherent and distinct components extending uniformly along the fiber axis, said one component comprising a thermoplastic synthetic fiber-forming linear polymer as hereinbefore described and another component comprising the aforementioned polymer composition, has advantageous properties such as combined characteristics of those conjugated polymers and an excellent crimpability upon a heating or swelling treatment in the case when said components are arranged in a side by side or eccentric sheath-core relationship in the cross-section of the unitary filament, and it also possesses excellent anti-electrostatic and hydrophilic properties as long as the said polymer composition composed of the sulphonic acid containing compound exists continuously along the fiber axis, even if it occupies a rather small portion of the fiber.

As the drawing process, either of a cold drawing and a hot drawing may be employed and however, it is surprisingly unexpected fact that the synthetic fibers of the present invention further improve conspicuously its above mentioned durable anti-electrostatic and hydrophilic properties through, in particular, the hot drawing.

Embodiments for synthesizing the sulphonic acid containing compound constituting the composition for the synthetic fibers of the present invention are as follows:

(a) A synthesis of a sulphonic acid containing compound from a diol type polyalkylene oxide.—A diol type polyalkyleneoxide is melted by heating and reacted with epichlorohydrin (or epihalohydrin generally) in the presence of boron trifluoride or a Friedel-Crafts' catalyst to form a block copolymer of a polyalkylene oxide and epichlorohydrin. In this case, if a small amount of water co-exists in the reaction mixture, the water is possibly added to a ring-opened epichlorohydrin and an oligomer will be formed.

The thus obtained block copolymer is dispersed or dissolved in water and thereafter sulphonated by adding thereinto a predetermined amount of a sulphonating agent, e.g., representatively sodium sulphite. In the above instance, when all active chlorines in side chains of the polymer are required to be sulphonated, it can be effected by adding a lower alcohol to the above mentioned reaction mixture to precipitate excess sodium sulphite and the reaction product, i.e., sodium chloride, followed by a filtration and a distillation of the solvent.

Further, when the active chlorines are partly sulphonnated and thereafter thus prepared intermediate is subjected to a dehydrochlorination reaction by an alkali hydroxide in water or a lower alcohol such as methanol, ethanol and the like or in a nonpolar organic solvent such as benzene, toluene and the like, epoxy group and methylene group can be introduced into terminals or side chains of the molecule. Furthermore, by controlling the dehydrochlorination reaction by an alkali hydroxide, some active chlorine can be left unreacted, if so required. Thus, any functional group such as active chlorine, methylene group, epoxy group can be optionally introduced into the sulphonic acid containing compound. The above mentioned reaction processes are represented, for instance, as follows:

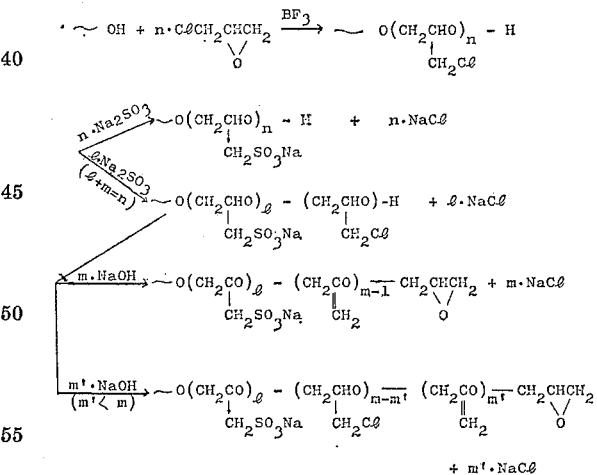

(b) A synthesis of a sulphonic acid containing compound having no polyalkyleneoxide therein.—Epichlorohydrin is polymerized in an organic solvent of carbon tetrachloride in the presence of the same catalyst as employed in (a) above. A homopolymer of epichlorohydrin thus obtained is treated with sodium sulphite at a temperature of 100–200° C. under atmospheric pressure or under an increased pressure if required, to sulphonate all or a part of halogenated alkyl groups thereof, and a sulphonic acid containing compound having any desired amount of functional groups in its molecules, as in the case (a), is obtained.

The compound having at least one combined —$SO_3M$ group in its molecule which is comprised in the polymer composition constituting the fiber of the present invention is noticeably different in the melting point or in the melt viscosity from the similar compound having no —$SO_3M$ group in its molecule. For instance, a block copolymer of a polyalkyleneoxide having no sulphonic acid group and having its molecular weight of about 10,000 and epichlorohydrin becomes a liquid form according as the tendency of its block copolymerization is more increased. Further, an epichlorohydrin homopolymer having its molecular weight of about 10,000 or less is also not solid but liquid or greasy at room temperature. Furthermore, both the above mentioned block copolymer and the epichlorohydrin homopolymer show a markedly low melt viscosity at 200–300° C. However, the sulphonic acid containing compound prepared by introducing sulphonic acid groups into the above mentioned block copolymer or epichlorohydrin homopolymer is a crystalline solid at room temperature having a narrow range of its softening point and an extremely high melt viscosity at 200–300° C.

The softening point and the melt viscosity of the sulphonic acid containing compound mentioned above are most significant for forming a uniform polymer composition by incorporating the sulphonic acid containing compound into a synthetic linear polymer such as a polyamide, polyester, polyesterether, polyolefin or the like during or after a polymerization process of the polymer, or for improving spinnability and drawability of filaments when the polymer composition having such a sulphonic acid containing compound uniformly incorporated therewith is subjected to melt-spinning followed by drawing. That is to say, when the melt viscosity of the aforementioned sulphonic acid containing compound is close to that of the synthetic linear polymer, the most preferred result is obtainable with respect to dispersibility and miscibility of the compound in the polymer as well as spinnability and drawability of the filament. For instance, in etiher case of melt spinning of the polymer composition which have been prepared in advance by blending homogeneously the sulphonic acid containing compound with the synthetic linear polymer and of extruding a melt blend of the sulphonic acid containing compound and the synthetic linear polymer, the uniformly miscible ability of the sulphonic acid containing compound in the polymer is extremely improved as compared with any conventional compounds as such, since the sulphonic acid containing compound is a solid substance having a high melt viscosity.

The sulphonic acid containing compound constituting the polymer composition comprised in the fibres of the present invention increases its hydrophilicity according as the content of sulphonic acid combined thereto is larger and becomes water soluble when the content is exceedingly large.

On the other hand, the synthetic fibers composed of a polymer composition comprising the sulphonic acid containing compound as well as a textile product made therefrom possesses substantially durable, excellent anti-electrostatic and hydrophilic properties which can sufficiently withstand various treatments or laundering, particularly when the compound has an enough large molecular weight, e.g., 400–20,000, that is, an enough long molecular chain.

Besides, when the polyalkyleneoxide comprises an aqueous insoluble polyether such as polypropylene glycol (hereinafter referred to as PPG), polytetramethylene glycol (hereinafter referred to as PTG) and the like, it is possible to control optionally as one's desire a hydrophilic-hydrophobic balance of the sulphonic acid containing compound prepared therefrom, by determining a relevant synthesis condition so that an appropriate amont of the sulphonic acid group may be introduced into the compound as required. Furthermore, if at least one kind of functional groups such as active chlorines, methylene groups, epoxy groups and the like is introduced into the molecules of the above mentioned compound and the resulting compound is incorporated into a synthetic linear polymer such as a polyamide, polyester, polyesterether, polyolefin and the like during its polymerization reaction or before the melt spinning process, the active chlorines, methylene groups, epoxy groups in the sulphonic acid containing compound react and are firmly combined with the polymer, so that the sulphonic acid containing compound will never come off the polymer composition by laundering or other washing treatments. Thus the polymer can be provided with durable anti-electrostatic and hydrophilic properties and it is also a prominent feature of the fibers of the present invention.

As is mentioned above, the synthetic fibers of the present invention, i.e., synthetic fibers composed of a synthetic linear polymer such as a polyamide, polyester, polyesterether, polyolefin and the like, having 0.05—40% by weight based on the total polymer composition of the above mentioned sulphonic acid containing compound incorporated and uniformly dispersed therein possess durable antielectrostatic and hydrophilic properties in addition to their inherent excellent properties. Accordingly, needless to say, the fibers of the present invention have obviated any drawbacks caused by deficiencies of antielectrostatic and hydrophilic properties in conventional synthetic fibers and have overcome defects of conventional processes for imparting temporary anti-electrostatic and hydrophilic properties to synthetic fibers. In particular, the fibers of the present invention have not any wearing uncomfortableness inherent in hydrophobic fibers and have a hand similar to natural fibers, and therefore, they are suitable as materials for various garments, upholsteries, industrial goods, etc., in a form of fibers or other shaped articles.

The present invention will be illustrated in more detail according to the following examples. In the examples, "part" or "percent" means by weight, and the denotation $[\eta]$ represents an inherent viscosity determined in a meta-cresol solvent at 30° C. in the case of a polyamide or that in an orthochlorophenol solvent at 30° C. in the cases of a polyester and a polyesterether.

As test-pieces for determiniations of water absorbency and voltage of triboelectricity of fibers, use was made of a drawn yarn which was washed in 0.2% aqueous solution of a household abluent at 80° C. for 30 minutes, rinsed repeatedly five times in hot water and dried.

The voltage of triboelectricity of fibers was determined according to the following manner:

A test-piece of yarn was conditioned for 24 hours in an atmosphere of 20° C., 65% R.H. and thereafter passed rubbing on a titan porcelainous body at a running speed of 100 meters per minute under a constant tension exerted thereupon by a tension washer, to generate triboelectricity, the voltage of which was measured by an electrostatic induction method by means of a rotatory sector.

EXAMPLE 1

Five hundred parts of polyethylene glycol (hereinafter referred to as PEG) having its average molecular weight of about 4,000 which had been perfectly dehydrated in advance were melted at 70° C. in a vessel. To the melt were added 2.5 parts of 47% etherate of $BF_3$. The mixture was thoroughly agitated and 70 parts of epichlorohydrin (hereinafter referred to as EP) were further added dropwise thereinto requiring 2 hours, to react therewith at an inner temperature of 65–70° C. After completion of the adding, the reaction mixture was further agitated for an hour at the same temperature as above, whereafter the catalyst and a small amount of unreacted components were distilled off under a reduced pressure upon a boiling water bath. A PEG/EP block copolymer thus obtained was dissolved in 1,500 parts of water, whereinto an aqueous solution of sodium hydroxide was added to neutralize the acidity of $BF_3$ employed as the catalyst. 75.7 parts of sodium sulphite were further added under agitation at 80° C. into the vessel where a reaction was effected still under agitation. After the reaction mixture had turned to a homogeneous phase, the agitation was continued for an hour and then the reacted liquid was cooled down to room temperature. Thereafter, the reacted liquid was condensed under a reduced pressure upon a hot water bath, to distil off water completely. A waxy product thus obtained was dissolved in 2,000 parts of 99.5% ethanol to precipitate by-produced sodium chloride which was then filtered off and the ethanol solution was condensed under a reduced pressure to distil completely ethanol out of the solution, and a solid product of sulphonic acid containing compounds was obtained. The product contained 3.75% of sulphur combined therewith and had a degree of sulphonation of 97%.

It was conceived that the resultant product was a mixture having the following average structural formulae:

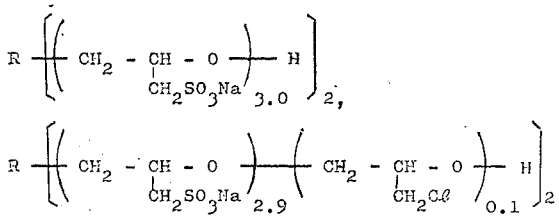

Next, 5 parts of the sulphonic acid containing compound, 95 parts of epsilon-caprolactam, 3 parts of water, 0.3 part of titanium dioxide, a small amount of a light stabilizer of an inorganic manganese compound and 0.15 part of acetic acid were introduced into an autoclave previously purged with nitrogen gas where the mixture was heated for 3 hours at 260° C. under a gauge pressure of 1.5 kg./cm.$^2$ (hereinafter a pressure will mean by gauge) and further heated for 2 hours at 260° C. under atmospheric pressure while agitating, to obtain a pre-condensation product. Then, after reducing the inner pressure until the absolute pressure was reached to 300 mm. Hg, a polycondensation reaction was conducted at 260° C. for 5 hours. The polymer was discharged by pressurizing the autoclave using nitrogen gas with a pressure of 3 kg./cm.$^2$ and extruded from the bottom of the autoclave as a band which was then quenched in a water pool and cut into chips. On the other hand, for the purpose of comparison, a chip was manufactured in the same manner and under the same conditions as above except that the sulphonic acid containing compound was not added.

After washing the respective chips with water at 80° C. for 20 hours to extract water soluble components therefrom, the chips were dried at 80° C. under a reduced pressure of 0.1 mm. Hg to decrease their water content to 0.05%.

Using a screw extruder, the respective dried chips thus obtained were melt-extruded at 270° C. to form freshly spun yarns of 240 denier of 18 filaments which were then cold drawn to 3.51 times their original length at 20° C. under 65% R.H., and drawn yarns having their properties as shown in Table 1 were obtained.

TABLE 1

| | Polymer | | Yarn | | | |
|---|---|---|---|---|---|---|
| Yarn sample | [η] | Water soluble component (percent) | Tensile strength at break (g./denier) | Elongation at break (percent) | Water absorbency of fiber percent) | Voltage of triboelectricity (v.) |
| Present invention | 1.2 | 9.2 | 5.1 | 34.5 | 16.5 | 200 |
| Comparison | 1.2 | 8.5 | 5.3 | 31.4 | 9.4 | 2,400 |

As is apparent from Table 1 above, the synthetic fibers of the present invention have excellent, durable anti-electrostatic hydrophilic properties.

EXAMPLE 2

The sulphonated PEG derivative manufactured in Example 1 was sufficiently dried and granulated, and mixed well in advance with the nylon-6 chip for comparison also prepared in Example 1, in various proportions. The mixture was charged into a hopper previously purged with nitrogen gas and melt blended in an extruder having a barrel diameter of 40 mm. wherefrom extruded as a band which was cut into chips again. The resultant chip was dried at 80° C. under a reduced pressure of 0.1 mm. Hg and melt extruded and spun yarn was drawn in the same manner and under the same conditions as in Example 1. Thus a drawn yarn of 70 denier of 18 filaments was obtained, which had its properties as given in Table 2 that follows:

TABLE 2

| Mixing proportion (percent) | | Yarn property | | | |
|---|---|---|---|---|---|
| Nylon-6 | Composition of the present invention | Tensile strength at break (g./denier) | Elongation at break (percent) | Water absorbency of fiber (percent) | Voltage of triboelectricity (v.) |
| 100 | 0 | 5.3 | 31.4 | 9.4 | 2,400 |
| 99.95 | 0.05 | 5.3 | 32.0 | 10.1 | 1,500 |
| 99.9 | 0.1 | 5.4 | 32.5 | 10.8 | 800 |
| 99.5 | 0.5 | 5.3 | 33.6 | 11.5 | 500 |
| 99 | 1 | 5.4 | 30.1 | 13.2 | 300 |
| 95 | 5 | 5.2 | 35.5 | 16.8 | 100 |
| 90 | 10 | 4.8 | 33.9 | 26.5 | 50 |
| 70 | 30 | 4.5 | 37.2 | 31.4 | 50 |
| 60 | 40 | 4.1 | 38.5 | 32.5 | 50 |
| 50 | 50 | 3.0 | 42.1 | 35.6 | 50 |

The above result shows that when the content of the sulphonic acid containing compound is 0.05% or more, effects of hydrophilicity and anti-static electrification are observed and in particular, when it is 0.1–30%, or more preferably 0.5–10%, a good result is obtainable, while if the content is in excess of 40%, the tenacity of fibers is noticeably decreased.

Further, PEG that was a material employed in Example 1 or the PEG/EP block copolymer that was an intermediate derivative therefrom was well mixed in advance with a nylon-6 chip in the same proportion as the above and those were tried to melt blend in the extruder, and however either one was softened at the entrance of the hopper, so that it did not get into the screw barrel, forming a lump and an objective polymer blend was unable to be taken out.

EXAMPLE 3

A PEG/EP block copolymer was prepared in the same manner and under the same conditions as in Example 1, except that using 500 parts of PEG having its average molecular weight of about 8,000 and 1.6 parts of 47% etherate of BF$_3$, 35 parts of EP were added to the molten mixture under agitation, to react therewith. The obtained copolymer was dissolved in 1,500 parts of water and 30 parts of sodium sulphite were added thereto under agitation at 80° C., to sulphonate ⅔ of active chlorines in the polymer. To the aqueous solution of the partially sulphonated PEG derivatives thus obtained were further added at 50–60° C. 5 parts of sodium hydroxide to effect a dehydrochloric acid reaction followed by a neutralization of the solution with hydrochloric acid and a dehydration same as in Example 1. To the resultant product, ethanol was added to precipitate by-produced sodium chloride which was then filtered off. By distilling off ethanol out of the solution, a solid product of a sulphonic acid containing compound having a combined sulphur content of 1.4% and an epoxy value of 0.22 meq./g. was obtained.

It was conceived that the resultant product was a mixture having the following average structural formulae:

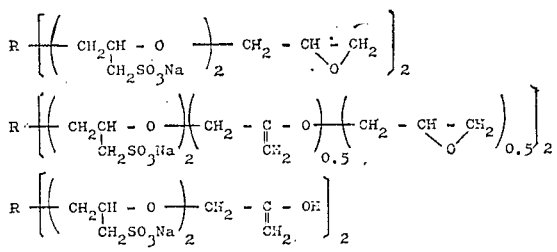

The above prepared product was sufficiently dried and granulated. After blending well in advance 3 parts of the granulated product with 97 parts of nylon-66 having an inherent viscosity [η] of 1.1 and 42 meq./kg. of terminal amino groups, the blend was charged into an extruder at 285° C. through a hopper perfectly sealed by dry nitrogen gas and extruded to spin directly an undrawn yarn of 240 denier of 18 filaments which was collected on a tube and thereafter hot drawn to 3.7 times its original length on a roll heated at 90° C. On the other hand, for the purpose of comparison, the above mentioned nylon-66 chip was spun and the resultant yarn was drawn under the same temperature conditions as the above. Yarn properties were determined with respect to each yarn sample and the result given in the following Table 3 was obtained.

TABLE 3

| Yarn sample | Water soluble component (percent) | Tensile strength at break (g./denier) | Elongation at break (percent) | Water absorbency (percent) | Voltage of triboelectricity (v.) |
|---|---|---|---|---|---|
| Present invention | 1.5 | 4.6 | 26.2 | 15.3 | 150 |
| Comparison | 1.3 | 4.5 | 25.6 | 9.5 | 2,200 |

EXAMPLE 4

Fifty parts of PTG having its terminals of hydroxyl group and having its average molecular weight of about 1,000 were melted at 60° C. To the melt was added 0.4 part of 47% etherate of $BF_3$ and were further added gradually 28 parts of EP under agitation to react therewith. Thus prepared was a PTG/EP block copolymer which was in a liquid form at room temperature. The copolymer was then dispersed in a one to one mixed solution of ethanol and water, whereto 48 parts of potassium sulphite were added to make a suspension. The mixture was introduced into an autoclave where a reaction was conducted for three hours at an inner temperature of 150° C. while agitating under a nitrogen gas atmosphere. After cooling, the reaction product was taken out, precipitates were separated therefrom and the solvent was expelled off. To the residue, a large excess of 99.5% ethanol was added and by-produced potassium chloride was filtered off. Upon distilling off ethanol, a sulphonic acid containing compound which was in a waxy form at room temperature was obtained.

It was conceived that the resultant product had the following average structural formula:

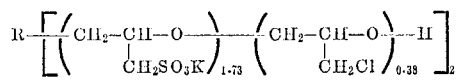

The product obtained as above contained 8.1% of combined sulphur and 1.8% of active chlorine, and was dissolved in cold water in a form of a suspension. Further the product had a degree of sulphonation of 83%.

On the other hand, 98 parts of a PET chip having its inherent viscosity [η] of 0.67 were mixed well with 2 parts of the powdery compound prepared as above and the mixture was charged into a screw extruder having its barrel diameter of 40 mm. and its barrel temperature of 280° C., where melt blending was effected. The melt was extruded in a form of a band which was then cut into chips again. After drying sufficiently, the resultant chip was fed into a screw extruder having its temperature kept at 285° C. and melt-spun to form a filament yarn which was wound on a bobbin. The thus produced undrawn yarn was hot drawn to 4.2 times its original length on a draw-pin heated at 90 C. and immediately heat-set by passing over a hot plate heated at 150° C., and a drawn yarn of 75 denier of 24 filaments comprising the sulphonic acid containing compound was obtained. Further, another drawn yarn was manufactured for the purpose of comparison by spinning the same PET chip and drawing in the same conditions as above except that the compound prepared before was not incorporated into the PET.

The test result obtained with respect to those yarns is given in Table 4.

TABLE 4

| Yarn sample | [η] | Water soluble component (percent) | Tensile strength at break (g./denier) | Elongation at break (percent) | Water absorbency (percent) | Voltage of triboelectricity (v.) | Degree of whiteness (percent) |
|---|---|---|---|---|---|---|---|
| Present invention | 0.65 | 0.4 | 4.2 | 22.5 | 5.3 | 50 | 85 |
| Comparison | 0.66 | 0.3 | 4.3 | 21.7 | 1.8 | 1,600 | 87 |

A tricot having a back-half texture was knit with the above prepared drawn yarn, washed successively in an abluent solution and water and dried. A water absorbing speed of the fabric was determined by dropping a drip of water onto the horizontally stretched fabric from 2 cm. up above it and measuring a time required for the water to spread in a circle of 4 cm. diameter. The water absorbing speed of the fabric knit from the yarn of the present invention was 4 seconds, while the fabric knit from the comparative yarn did not absorb the water drop even after 6 minutes.

Further, in order to examine an effect of repeated launderings on removal of the sulphonic acid containing compound from the fibers, an amount of combined sulphur was measured with respect to the yarn sample which had been previosuly prepared by washing for the purpose of determination of water absorbency and which had been further subjected to repeated launderings, and the result given in Table 5 was obtained.

TABLE 5

| Frequency of launderings | 0 | 1 | 5 | 10 | 20 |
|---|---|---|---|---|---|
| Combined sulphur in the fiber (percent) | 0.16 | 0.15 | 0.15 | 0.16 | 0.14 |

Furthermore, PTG employed for the synthesis of material in this example was tried to melt blend with a PET chip in the same proportion as the above and however it was unable to be delivered into the extruder due to its low softening point.

EXAMPLE 5

To 50 parts of PPG having nonylphenol group at one terminal of its molecules and having its average molecular weight of 2,000 was added 0.2 part of 47% etherate of $BF_3$ and were further added gradually 9.4 parts of EP under agitation at 50° C. to react therewith and a nonylphenol PPG/EP copolymer was obtained. The copolymer was dispersed in a mixed solution consisting of 2 parts of methanol and 1 part of water, and 12 parts of sodium sulphite were further added thereto. The mixture was reacted for three hours under a refluxing condition while agitating. To the reactant were added 1.2 parts of sodium hydroxide which were dissolved thereinto at 50–60° C. under agitation, whereby a dehydrochloric acid reaction was effected. After neutralizing, the reactant was condensed by evaporating the solvent under a reduced pressure and a large excess of ethanol was added thereto, to precipitate inorganic salts which were then filtered off. Upon distilling off ethanol, an objective waxy sulphonic acid containing compound having a combined sulphur content of 3.7% and an epoxy value of 0.38 meq./g. was obtained. It was hardly soluble in cold water and conceived to have the following average structural formula:

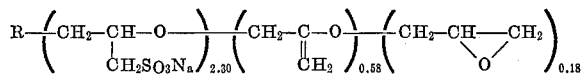

On the other hand, 118 parts of para-oxyethoxybenzoic acid methylester, 8 parts of the aforementioned reaction product, 0.059 part of zinc acetate and 0.041 part of antimony trioxide were introduced into an autoclave previously perfectly purged with nitrogen gas. A heating was conducted at 220° C. under atmospheric pressure in a nitrogen gas atmosphere to distill out methanol, whereafter a temperature of 250° C. was kept for three hours under a pressure of 70 mm. Hg and then finally a temperature of 270–280° C. was kept for four hours under a reduced pressure of 1 mm. Hg. Thereafter, the atmospheric pressure was restored by introducing nitrogen gas into the autoclave and the resultant polymer was extruded from the bottom of the autoclave pressurized by nitrogen gas of 3 kg./cm.², in a form of a band which was then cut into the chips. Further, for the purpose of comparison, another polymer chip was prepared by processing in the same manner and under the same conditions as the above except that the aforementioned compound was not incorporated. Those obtained chips of two kinds were respectively dried sufficiently and melt extruded at 280° C. to form filament yarns, using a screw extruder. The formed undrawn yarns were hot-drawn to 4.1 times their original length on a draw pin heated at 90° C. and drawn yarns of 70 denier of 35 filaments were obtained. The properties of the thus obtained yarns will be shown in Table 6 which follows:

added thereinto, a dehydrochloric acid reaction was effected for five hours under a refluxing condition. Then the solvent was distilled off, and excess of ethanol was added to the residue to separate inorganic salts therefrom, ethanol was thereafter distilled off and a sticky substance of a sulphonic acid containing compound was obtained. It was conceived that thus obtained substance had the following average structural formula:

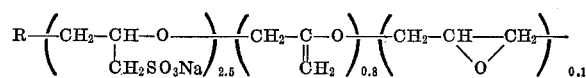

On the other hand, 129 parts of epsilon-caprolactam, 6.3 parts of epsilon-aminocaproic acid and 15 parts of the above mentioned reaction product were mixed and put into a test tube, where a polymerization reaction was carried out at 250° C. for six hours passing thereinto nitrogen gas. A polymer obtained was roughly crushed up and dried. 10 parts of thus prepared polymer particulate and 90 parts of the nylon-6 chip used for preparing the comparative sample in Example 1 were mixed well with each other and supplied to a hopper of an extruder, while the PET chip employed for the preparation of the comparative sample in Example 4 was supplied to a hopper of another extruder. Those two materials were melted separately in the respective extruders at melting temperatures of 275° C. for nylon-6 and of 285° C. for PET. Equal amounts of the two melts were transferred to a same spinneret wherein they were conjugated and extruded simultaneously from the same orifices of the spinneret to form a conjugate filament yarn in which nylon-6 and PET were arranged in a sheath-core relationship in its unitary filament. The resulting yarn was drawn at room temperature to 3.59 times its original length and a drawn yarn of 40 denier of 6 filaments was obtained.

Besides the above, for the purpose of comparison, nylon-6 and PET were conjugate spun and the spun yarn was drawn in the same manner as the above, and a yarn of 40 denier of 6 filaments was produced.

Those yarns had their properties as shown in Table 7.

TABLE 6

| Yarn sample | [η] | Water soluble component (percent) | Tensile strength at break (g./denier) | Elongation at break (percent) | Water absorbency (percent) | Voltage of triboelectricity (v.) |
| --- | --- | --- | --- | --- | --- | --- |
| Present invention | 0.60 | 0.65 | 4.0 | 28.2 | 6.8 | 50 |
| Comparison | 0.62 | 0.63 | 4.2 | 23.5 | 2.4 | 1,600 |

EXAMPLE 6

Forty-three parts of EP were dissolved in 100 parts of carbon tetrachloride and the solution was cooled down to 5° C. 7.5 parts of 47% etherate of BF₃ were added to the solution and a reaction was effected at 30–35° C. for three hours under agitation. Next, carbon tetrachloride and non-reacted EP were removed under a reduced pressure, to obtain a greasy EP homopolymer which was then dispersed in 300 parts of a one to one mixed solvent of methanol and water. To the dispersion were further added 50 parts of sodium sulphite and a reaction was conducted at 150° C. for three hours while agitating the reaction mixture in an autoclave, as in Example 4. After the reaction product was taken out and 10 parts of sodium hydroxide were

TABLE 7

| Yarn Sample | Water soluble component (percent) | Tensile strength at break (g./denier) | Elongation at break (percent) | Water absorbency (percent) | Voltage of triboelectricity (v.) |
| --- | --- | --- | --- | --- | --- |
| Present invention | 1.0 | 4.2 | 36.7 | 7.5 | 200 |
| Comparison | 1.1 | 4.3 | 35.4 | 4.8 | 2,300 |

What is claimed is:
1. A fiber having durable anti-electrostatic and hydrophilic properties which comprises a polymer composition consisting of 99.95—60% by weight of a thermoplastic synthetic linear polyamide and 0.05—40% by weight of at least one sulphonic acid-containing compound selected from the group consisting of:

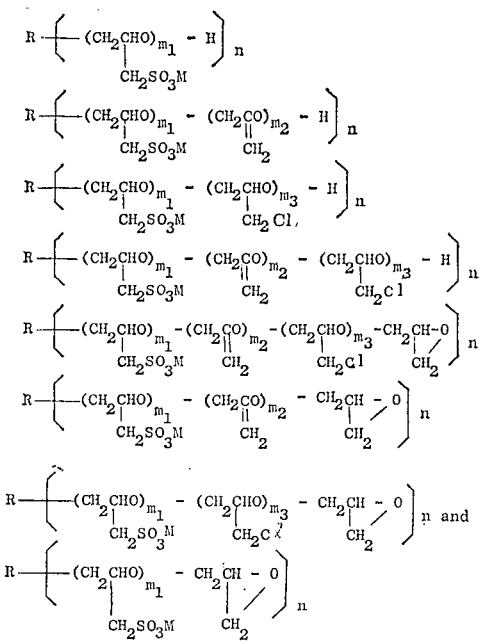

where, $n$ is an integer of 1 or 2; when $n$ is 1, R denotes hydrogen, $R_1O$— or $R_1O$-(polyalkyleneoxide)— wherein $R_1$ denotes hydrogen or an alkyl, aralkyl or aryl group having 1–18 carbon atoms, or a cycloalkyl group having an alicyclic ring formed by 3–8 carbon atoms, or carboxylic acid residue which is represented by omitting terminal hydroxyl group from carboxylic group; when $n$ is 2, R denotes a polyalkyleneoxide group; further $m_1$ is an integer of 1–30; $m_2$ and $m_3$ are integers of 1–6; and M denotes hydrogen, an alkali metal or alkaline earth metal.

2. A fiber as claimed in claim 1, wherein the said polyalkyleneoxide is selected from the group consisting of polyethyleneoxide, polypropyleneoxide, polytetramethyleneoxide, a random copolymer thereof and a block copolymer thereof.

3. A fiber as claimed in claim 2, wherein the polyalkyleneoxide has its average molecular weight of not more than 20,000.

4. A fiber as claimed in claim 2, wherein the polyalkyleneoxide has its average molecular weight of not more than 10,000.

5. A fiber as claimed in claim 1, wherein the said polyamides are poly-ε-caproamide and polyhexamethylene adipamide.

6. A fiber as claimed in claim 1, wherein the polymer composition consists of 99.9—70% by weight of a thermoplastic syntheic linear polyamide and 0.1—30% by weight of at least one sulphonic acid containing compound as defined herein.

7. A fiber as claimed in claim 1, wherein the polymer composition consists of 99.5—90% by weight of a thermoplastic synthetic linear polyamide and 0.5—10% by weight of at least one sulphonic acid containing compound as defined herein.

8. A fiber as claimed in claim 1, wherein the sulphonic acid containing compound has at least one active group other than the sulphonic acid group and thereby links with another active group in the thermoplastic synthetic linear polyamide.

9. A fiber as claimed in claim 8, wherein the active group is an active chlorine, an unsaturated ethylene group or an epoxy group.

10. A fiber as claimed in claim 1, which has been subjected to a hot drawing.

References Cited
UNITED STATES PATENTS
3,514,498  5/1970  Okazaki _____ 260—857

PAUL LIEBERMAN, Primary Examiner

U.S. Cl. X.R.

161—175; 260—47 R, 47 EQ, 75 R, 75 T, 75 Ep, 75 S, 78 R, 78 A, 78 SC, 92.8 A, 94.9 GD, 823, 830 S, 836, 837 R, 837 PV, 857 R, 858, 860, 874, 897 R, 899